United States Patent
Adam et al.

(10) Patent No.: US 10,259,449 B2
(45) Date of Patent: Apr. 16, 2019

(54) METHOD FOR OPERATING A DRIVE DEVICE AND CORRESPONDING HYBRID DRIVE DEVICE

(71) Applicant: AUDI AG, Ingolstadt (DE)

(72) Inventors: Martin Adam, Meissen (DE); Stefan Schlederer, Pförring (DE)

(73) Assignee: AUDI AG, Ingolstadt (DE)

( * ) Notice: Subject to any disclaimer, the term of this patent is extended or adjusted under 35 U.S.C. 154(b) by 92 days.

(21) Appl. No.: 15/519,767

(22) PCT Filed: Oct. 15, 2015

(86) PCT No.: PCT/EP2015/002041
§ 371 (c)(1),
(2) Date: Apr. 17, 2017

(87) PCT Pub. No.: WO2016/058698
PCT Pub. Date: Apr. 21, 2016

(65) Prior Publication Data
US 2017/0253235 A1    Sep. 7, 2017

(30) Foreign Application Priority Data

Oct. 18, 2014  (DE) .................. 10 2014 015 469

(51) Int. Cl.
*B60W 20/50*       (2016.01)
*B60R 16/03*       (2006.01)
(Continued)

(52) U.S. Cl.
CPC .............. *B60W 20/50* (2013.01); *B60K 6/26* (2013.01); *B60K 6/48* (2013.01); *B60K 6/485* (2013.01);
(Continued)

(58) Field of Classification Search
CPC ......... B60W 20/50; B60W 2050/0292; B60W 50/029
See application file for complete search history.

(56) References Cited

U.S. PATENT DOCUMENTS

| 8,174,228 B2 * | 5/2012 | Ozawa | H02P 23/14 |
| | | | 318/445 |
| 9,085,299 B2 * | 7/2015 | Takahashi | B60K 6/445 |

(Continued)

FOREIGN PATENT DOCUMENTS

| CN | 101236231 A | 8/2008 |
| CN | 101254744 A | 9/2008 |

(Continued)

OTHER PUBLICATIONS

Machine translation of JP 2006-94669 A into English, obtained from the European Patent Office (www.epo.org) on Sep. 30, 2018, original document date of publication Apr. 6, 2006, pp. 1-24. (Year: 2006).*

(Continued)

*Primary Examiner* — Todd M Melton
(74) *Attorney, Agent, or Firm* — Henry M. Feiereisen LLC

(57) ABSTRACT

The invention relates to a method for operating a hybrid drive device (2) which has an internal combustion engine (3) and an electric machine (4) which can be or is operatively connected to the internal combustion engine (3) and can be operated as a generator, wherein in a normal operating mode a temperature of the electric machine (4) is determined by means of a temperature sensor (14), and operation of the electric machine (4) is permitted only if the temperature is lower than a predefined maximum temperature. There is provision here that in the event of a defect in the temperature sensor (14) an emergency operating mode is carried out in which operation of the electric machine (4) is permitted only (Continued)

with limited power, limited torque and/or over a limited time period. The invention further relates to a hybrid drive device (2).

17 Claims, 1 Drawing Sheet

(51) Int. Cl.
  *B60K 6/485* (2007.10)
  *B60K 6/48* (2007.10)
  *B60K 6/26* (2007.10)
  *B60W 50/02* (2012.01)
  *B60W 50/029* (2012.01)

(52) U.S. Cl.
  CPC ........ *B60R 16/03* (2013.01); *B60K 2006/262* (2013.01); *B60K 2006/4825* (2013.01); *B60W 2050/0215* (2013.01); *B60W 2050/0292* (2013.01); *B60W 2510/087* (2013.01); *B60W 2710/083* (2013.01); *B60W 2710/086* (2013.01); *Y02T 10/6221* (2013.01); *Y10S 903/93* (2013.01)

(56) References Cited

U.S. PATENT DOCUMENTS

| | | | |
|---|---|---|---|
| 9,126,585 B2 * | 9/2015 | Takizawa | ............... B60K 6/445 |
| 9,438,157 B2 | 9/2016 | Adam et al. | |
| 2007/0102930 A1 | 5/2007 | Koike et al. | |
| 2009/0088294 A1 | 4/2009 | West et al. | |
| 2011/0246011 A1 | 10/2011 | Meyer-Ebeling et al. | |
| 2012/0203408 A1 | 8/2012 | Migita | |
| 2012/0304622 A1 | 12/2012 | Verbrugge et al. | |
| 2014/0095017 A1 | 4/2014 | Houle et al. | |
| 2016/0272219 A1 * | 9/2016 | Ketfi-Cherif | ....... B60W 50/029 |

FOREIGN PATENT DOCUMENTS

| | | |
|---|---|---|
| CN | 202230399 U | 5/2012 |
| DE | 10 2008 048 463 A1 | 5/2009 |
| DE | 10 2010 016 328 A1 | 10/2011 |
| DE | 10 2012 209 202 A1 | 12/2012 |
| JP | 2006-94669 | 4/2006 |
| JP | 2010-220374 | 9/2010 |

OTHER PUBLICATIONS

International Search Report issued by the European Patent Office in International Application PCT/EP2015/002041.

Chinese Search Report dated Oct. 29, 2018 with respect to counterpart Chinese patent application 2015800563042.

Translation of Chinese Search Report dated Oct. 29, 2018 with respect to counterpart Chinese patent application 2015800563042.

* cited by examiner

METHOD FOR OPERATING A DRIVE DEVICE AND CORRESPONDING HYBRID DRIVE DEVICE

CROSS-REFERENCES TO RELATED APPLICATIONS

This application is the U.S. National Stage of International Application No. PCT/EP2015/002041, filed Oct. 15, 2015, which designated the United States and has been published as International Publication No. WO 2016/058698 and which claims the priority of German Patent Application, Serial No. 10 2014 015 469.6, filed Oct. 18, 2014, pursuant to 35 U.S.C. 119(a)-(d).

BACKGROUND OF THE INVENTION

The invention relates to a method for operating a hybrid drive device having an internal combustion engine and an electric machine which is operatively connectable or operatively connected to the internal combustion engine and which can be operated as a motor and as a generator, wherein in a normal operating mode a temperature of the electric machine is determined by means of a temperature sensor, and operation of the electric machine is permitted only when the temperature is less than a predefined maximum temperature. The invention further relates to a hybrid drive device.

The hybrid drive device is used, for example, for propelling a motor vehicle, i.e. to provide a torque for propelling the motor vehicle. The hybrid drive device includes a plurality of drive units, in particular at least two drive units, which are preferably of different types. For example, a first drive unit is configured as an internal combustion engine and a second drive unit is configured as an electric machine. The electric machine is operatively connectable or operatively connected to the internal combustion engine. In particular, a clutch is therefore provided between the electric machine and the internal combustion engine, by means of which an operative connection can be established between the drive units.

For example, it is provided that the electric machine is permanently connected to an output shaft of the hybrid drive device while the internal combustion engine can be disconnected by the clutch from the output shaft. Accordingly, provision can be made for the internal combustion engine and the electric machine to jointly provide, at least temporarily, the output torque of the hybrid drive device, which output torque is applied to the output shaft. Within the scope of the afore-described embodiment, the output torque can, however, also be generated only by the electric machine, i.e. without involvement of the internal combustion engine.

The electric machine can be operated both as a motor and as a generator. In both cases, it provides a torque that is positive in the case of the motor, i.e. it relates to an acceleration of the output shaft, whereas the torque is negative when being operated as a generator. In the latter case, the electric machine provides electrical energy, for example for an on-board electrical system of the motor vehicle.

The hybrid drive device preferably has at least one energy store, in particular a battery, in which the electrical energy can be temporarily stored. Likewise, provision may be made for the presence of a plurality of different on-board electrical systems, for example a high voltage on-board electrical system and a low voltage on-board electrical system, wherein a higher voltage is present than in the high voltage on-board electrical system than in the low voltage on-board electrical system. The high voltage on-board electrical system and the low voltage on-board electrical system can be electrically connected to one another via a voltage transformer. Preferably, the voltage transformer is used to feed or support the low voltage on-board electrical system with electrical energy from the high voltage on-board electrical system. Accordingly, the energy store is advantageously associated to the high voltage on-board electrical system and is operated with the voltage of the high voltage on-board electrical system.

In particular, when a large torque is provided in the case of a motor operation of the electric machine or a high electric power in the case of a generator operation, a substantial amount of heat is generated in the electric machine. This means that its temperature normally rises rapidly, with the temperature rise depending in particular on an ambient temperature. However, operation of the electric machine is preferred to be permitted only in a particular temperature range in order to prevent damage to the electric machine. In particular, at a high temperature of the electric machine, damage to a winding or other components of the electric machine can occur.

For this reason, the electric machine has the temperature sensor, by which its temperature can be determined. The temperature sensor is hereby in particular in heat transfer connection to particularly critical regions of the electric machine. Operation of the electric machine is now permitted at least in the normal operating mode only when the temperature, determined by the temperature sensor, is less than a predefined maximum temperature. The maximum temperature is hereby established in such a way that no failure of or damage to the electric machine is to be expected, even when the electric machine is operated for a long period at a temperature which corresponds to the maximum temperature. In addition or as an alternative, provision may be made to limit the torque, generated by the electric machine, to a maximum torque which is determined on the basis of the temperature ascertained by the temperature sensor.

SUMMARY OF THE INVENTION

It is therefore an object of the invention to provide a method for operating a hybrid drive device, which, compared to known methods, has advantages, in particular reliably and effectively prevents damage to the electric machine due to excessive temperature.

This is achieved according to the invention by a method for operating a hybrid drive device having an internal combustion engine and an electric machine which is operatively connectable or operatively connected to the internal combustion engine and which can be operated as a motor and as a generator, wherein provision is hereby made for execution of an emergency operating mode in the event of a defective temperature sensor, so as to permit operation of the electric machine only with limited power, limited torque and/or for a limited time span. The defect of the temperature sensor can have numerous causes. For example, a defective measuring element of the temperature sensor, a defective supply line and/or a faulty connection, for example to a control unit, is to be understood as the defect of the temperature sensor. An excessive measurement accuracy of the temperature sensor can also be regarded as defect.

For example, it is provided to execute, at least once, especially however periodically, a diagnosis of the temperature sensor. This is preferably realized using a control unit, to which the temperature sensor is connected. When at least one of the afore-mentioned criteria is fulfilled within the framework of the diagnosis, the presence of a defect of the temperature sensor is recognized. If this is the case, the emergency operating mode is executed, or it is switched from the normal operating mode to the emergency operating mode.

In the emergency operating mode, the operation of the electric machine is to be permitted only with certain operating parameters, i.e. with limited power, limited torque and/or over a specific time span. Limited power and limited torque are hereby to be understood as relating to a power or torque, which is preferably less than a maximum power or maximum torque, respectively, of the electric machine. In this case, the design power or the design torque of the electric machine can be used as a maximum power or maximum torque.

When referring to the operation of the electric machine over the limited time span, it is to be understood that no lasting operation of the electric machine is permitted. Rather, for example, a timer is started immediately at the beginning of the operation of the electric machine and determines the time period over which the electric machine has previously been operated. When the duration of this time period reaches or exceeds the limited time span, operation of the electric machine is terminated. During the limited time span, operation of the electric machine can be permitted with the maximum power and/or the maximum torque. As an alternative, provision is made for a limitation as described above.

With such an approach, an inadmissibly high temperature rise in the electric machine can be effectively prevented, even when the temperature sensor is not available as a result of the defect. In particular, an exceeding of a maximum permissible temperature or of the predefined maximum temperature by the temperature of the electric machine is prevented, so that damage to the electric machine is ruled out. The described approach has the advantage that the electric machine is not completely switched off in the event of a defective temperature sensor, but in spite of the defect is still operational for applications with a low power demand, low torque demand, or those which can be carried out within the limited time span. Provision is thus made for an emergency operation of the electric machine.

According to a further configuration of the invention, when an ignition starter switch is provided and in a normal operating position, a shutdown of the internal combustion engine is prevented in the emergency operating mode. The ignition starter switch is used to specify a particular operating mode for the hybrid drive device. For example, it is provided as ignition lock, in which a driver of the motor vehicle inserts a key at the beginning of the operation and specifies with it the desired operating state. For example, the ignition starter switch may have a first position representing a locking position in which a steering wheel lock and/or a steering wheel catch are active.

In a second position, a power supply of the motor vehicle is activated, which is realized, in particular exclusively, from the energy store. In the second position, preferably only accessories of the motor vehicle are supplied with electrical energy, but not the hybrid drive device or at least not the internal combustion engine and the electric machine. In a third position, a power supply is provided for the internal combustion engine, in particular for an ignition of the internal combustion engine. This position corresponds to the normal operating position, which is permanently present during a driving operation of the motor vehicle. In a fourth position of the ignition starter switch, starting of the internal combustion engine is finally caused, in particular by means of the electric machine.

When the ignition starter switch is in the normal operating position and the internal combustion engine is running, a shutdown of the internal combustion engine is prevented in the event of a change from the normal operating mode to the emergency operating mode or in the presence of the emergency operating mode. Accordingly, the driving operation of the motor vehicle can be carried out essentially solely with the assistance of the internal combustion engine, i.e. the torque applied to the output shaft is essentially generated solely by the internal combustion engine.

According to a further configuration of the invention, the limited torque is less than a maximum torque and/or a continuous operating torque of the electric machine. Maximum torque is hereby to be understood as a torque that can be generated by the electric machine at the maximum, in particular during a short period of time. In this respect, the maximum torque can also be referred to as an overload torque. Conversely, the continuous operating torque is referred to as a torque of the electric machine, at which the latter can be operated continuously without the temperature exceeding the maximum permissible temperature or maximum temperature. The continuous operating torque can be determined—as described above—in dependence on the momentary temperature of the electric machine and/or an ambient temperature. As an alternative, the continuous operating torque can also be selected to be constant.

According to a particularly preferred configuration of the invention, the limited time span is selected in such a way that the temperature of the electric machine remains below the maximum temperature, even when the electric machine is operated at maximum torque. Since the momentary temperature of the electric machine is not known, the time span must be estimated. For example, the time span is predefined as constant, so that the temperature of the electric machine does not exceed the maximum temperature and/or the maximum permissible temperature at typical ambient conditions, even when operating at maximum torque and/or at continuous operating torque. Of course, the limited time span can alternatively also be determined as a function of at least one environmental variable, in particular the ambient temperature.

According to a preferred configuration of the invention, the limited power, the limited torque and/or the limited time span is/are determined as a function of at least one environmental variable, in particular the ambient temperature. Such an approach has already been referred to above. While the stated variables, i.e. the limited power, the limited torque and/or the limited time span, may, of course, be chosen to be constant, it is particularly advantageous to adjust them to the ambient conditions of the hybrid drive device or of the electric machine. This is realized by taking into account the environmental variable, which, for example, is represented by the ambient temperature. The ambient temperature is preferably determined by a temperature sensor, which is associated, for example, to the motor vehicle, but preferably is not connected to the same control unit as the afore-mentioned temperature sensor.

According to a preferred configuration of the invention, operation of the electric machine is not allowed for a certain downtime following operation for a certain time span. Thus, once the electric machine has been operated, it is to be provided with sufficient time to dissipate heat to its surroundings and thus to cool down. For this purpose, provision is made for the downtime of the electric machine after operation of the electric machine, in particular immediately after operation. During the downtime, operation of the electric machine is barred.

According to a further configuration of the invention, the downtime is determined as a function of an operating torque and/or an operating time during the preceding operation of the electric machine. While the downtime may, of course, be selected to be constant, it is particularly advantageous to adjust it to at least one operating variable of the electric machine during the immediately preceding operation. For this purpose, the downtime is determined as a function of the operating torque which is used during operation and, for example, corresponds to a mean value of the torque over the time span during which the electric machine is operated and/or as a function of the operating time. The operating time corresponds hereby to the length of the time period during which the electric machine has been operated.

According to a refinement of the invention, the electric machine is operated as a generator for supporting an on-board electrical system in the emergency operating mode. The electric machine is preferably electrically connected directly to the high voltage on-board electrical system of the motor vehicle, i.e. has an output voltage which corresponds to the voltage of the high voltage on-board electrical system. As already explained, the high voltage on-board electrical system is preferably electrically connected to the low voltage on-board electrical system via the voltage transformer. Operation of the electric machine as a generator is now carried out in such a way that only so much electrical energy is provided as is required by the low voltage on-board electrical system. Thus, no charging of energy store of the high voltage on-board electrical system should take place in the emergency operating mode.

Finally, provision may be made for using the electric machine in the emergency operating mode for starting the internal combustion engine. In the emergency operating mode, the power or the torque that can still be generated by the electric machine, is normally inadequate to carry out a satisfactory driving operation of the motor vehicle. For this reason, the electric machine is used for starting the internal combustion engine. For this purpose, the operative connection is established between the electric machine and the internal combustion engine, preferably via the clutch. For example, the internal combustion engine is carried out operated by the electric machine immediately after commencement of the emergency operating mode, i.e. preferably during changeover from the normal mode into the emergency operating mode.

The invention further relates to a hybrid drive device, in particular for carrying out the afore-described method, with the hybrid drive device including an internal combustion engine and an electric machine which is operatively connectable or operatively connected to the internal combustion engine and is operable as a motor and as a generator, wherein in a normal operating mode a temperature sensor determines a temperature of the electric machine sensor and operation of the electric machine is permitted only when the temperature is less than a predetermined maximum temperature. Provision is hereby made for the hybrid drive device to be configured in such a way that in the event of a defect of the temperature sensor, an emergency operating mode is executed, in which operation of the electric machine is permitted only with limited power, limited torque, and/or for a limited time span.

The advantages of such an approach or such a configuration of the hybrid drive device have already been pointed out. Both the method and the hybrid drive device can be refined in the manner described above, so that reference is made thereto.

BRIEF DESCRIPTION OF THE DRAWING

The invention will be explained in greater detail hereinafter with reference to the exemplary embodiments illustrated in the drawing, without limiting the invention. The sole

DETAILED DESCRIPTION OF PREFERRED EMBODIMENTS

Figure 1:
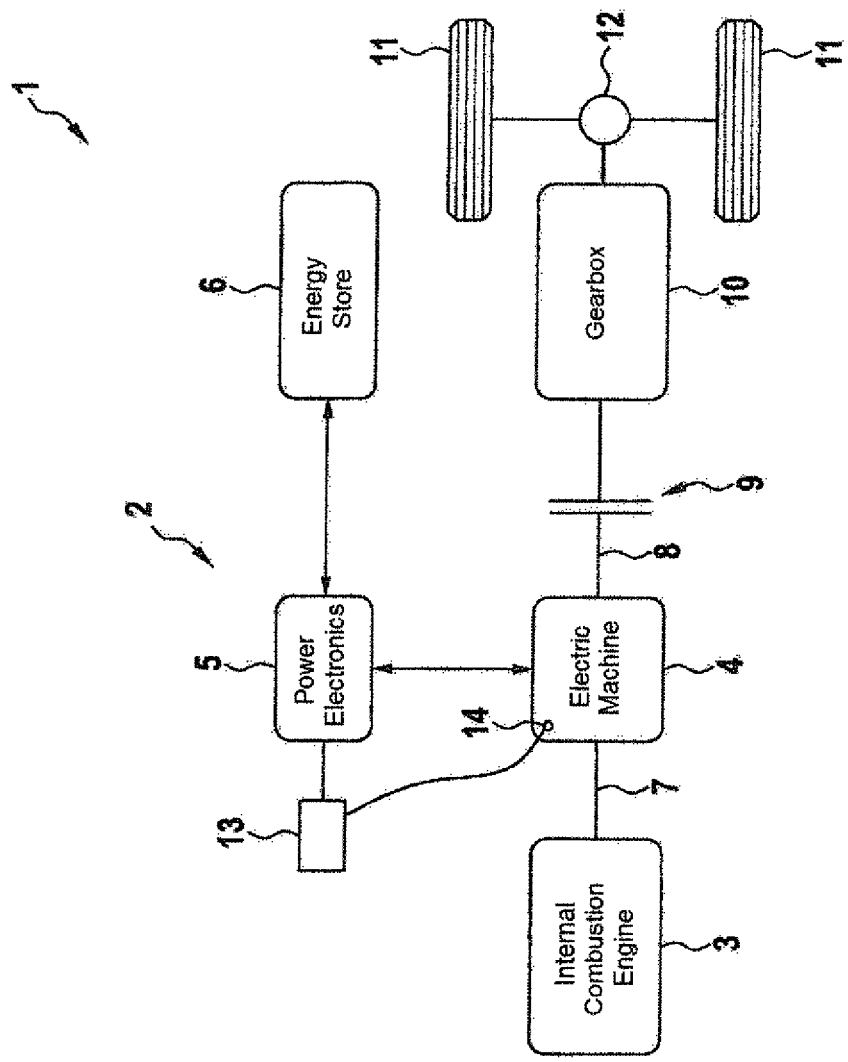
FIG. 1 shows a schematic illustration of a drive train of a motor vehicle with a hybrid drive device.

FIG. 1 shows a schematic illustration of a drive train 1 of a motor vehicle, which is not shown in greater detail and includes a hybrid drive device 2. The hybrid drive device 2 includes an internal combustion engine 3 and an electric machine 4, the latter being connected via a power electronics 5 to an energy store 6 or a high voltage on-board electrical system. In the embodiment shown here, the internal combustion engine 3 and the electric machine 4 are rigidly connected with one another via a connection shaft 7. Provision may, of course, be made to provide a separating clutch (not shown) in the connection shaft 7 and therefore in the operative connection between the internal combustion engine 3 and the electric machine 4 for separating the internal combustion engine 3 from the electric machine 4.

The electric machine 4 is connected preferably rigidly and/or permanently with an output shaft 8 of the hybrid drive device 2. The output shaft is coupled via a starting clutch 9 with a gearbox 10 of the drive train 1. An operative connection between the starting clutch 9 and the wheels 11 of the drive train 1 or the motor vehicle is established via the gearbox 10. A differential gear 12 can be provided in the operative connection between the gearbox 10 and the wheels 11.

The electric machine 4 or the power electronics 5 is controlled by a control unit 13. A temperature sensor 14 of the electric machine 4 is connected to the control unit. In a normal operating mode of the hybrid drive device 2, provision is now being made for determination of a temperature of the electric machine 4 by the temperature sensor 14. Operation of the electric machine 4 is permitted only when the temperature is less than a predetermined maximum temperature. In addition or as an alternative, provision may also be made for the control unit 13 to only permit a power which is less than a maximum power that is calculated in particular on the basis of the temperature determined by the temperature sensor 14. The same approach is applicable for the torque of the electric machine 4, with a maximum torque being determined on the basis of the temperature.

In the event a defect of the temperature sensor 14 is detected, in particular by the control device 13, a changeover is effected from the normal operating mode to an emergency operating mode. In the latter, operation of the electrical machine 4 is permitted only with limited power, limited torque and/or for a certain time span. With such a procedure, excessively high temperature of the electric machine 4 is being prevented, but at the same time at least limited operation of the electric machine 4 is still permitted. In the emergency operating mode, the electric machine 4 is used, for example, to start the internal combustion engine 3. In addition or as an alternative, the electric machine 4 can be used as a generator for supporting the on-board electrical system. Thus, in spite of the defective temperature sensor 14, at least a restricted driving operation of the motor vehicle is rendered possible.

What is claimed is:

1. A method for operating a hybrid drive device including an internal combustion engine and an electric machine which is operatively connectable or operatively connected to the internal combustion engine and which can be operated as a motor and as a generator, said method comprising:
    allowing operation of the electric machine when a temperature of the electric machine as determined by a temperature sensor is less than a predefined maximum temperature; and
    initiating an emergency operating mode of the electric machine when detecting a defect of the temperature sensor to thereby permit operation of the electric machine only with limited power, limited torque and/or for a limited time span,
    wherein at least one parameter selected from the group consisting of the limited power, the limited torque, and the limited time span is determined as a function of at least one environmental variable.

2. The method of claim 1, further comprising preventing a shutdown of the internal combustion engine, when the emergency operating mode is initiated and an ignition starter switch is in a normal operating position.

3. The method of claim 2, wherein the internal combustion engine is provided with a power supply, when the ignition starter switch is in the normal operating position.

4. The method of claim 1, wherein the limited torque is less than a maximum torque and/or a continuous torque of the electric machine.

5. The method of claim 1, wherein the limited time span is selected such that the temperature of the electric machine remains below the maximum temperature even when the electric machine is operated at maximum torque.

6. The method of claim 1, wherein the at least one environmental variable, is an ambient temperature.

7. The method of claim 1, further comprising barring operation of the electric machine for a specific downtime after operating the electric machine for certain time span.

8. The method of claim 7, further comprising determining the downtime as a function of an operating torque and/or an operating time during preceding operation of the electric machine.

9. The method of claim 1, wherein the electric machine is operated in the emergency operating mode as a generator for supporting an on-board electrical system.

10. The method of claim 1, wherein the electric machine is used in the emergency operating mode for starting the internal combustion engine.

11. A hybrid drive device, comprising:
    an internal combustion engine;
    an electric machine operatively connectable to the internal combustion engine and configured for operation as a motor and as a generator; and
    a temperature sensor determining in a normal operating mode a temperature of the electric machine, with the electric machine being permitted to operate only when the temperature is less than a predefined maximum temperature, wherein an emergency operating mode of the electric machine is initiated when detecting a defect of the temperature sensor so as to permit operation of the electric machine only with limited power, limited torque and/or for a limited time span, wherein at least one parameter selected from the group consisting of the limited power, the limited torque, and the limited time span is determined as a function of at least one environmental variable.

12. The hybrid drive device of claim 11, further comprising an ignition starter switch configured such that in a normal operating position of the ignition starter switch, a shutdown of the internal combustion engine is prevented, when the emergency operating mode of the electric machine is initiated.

13. The hybrid drive device of claim 11, further comprising a power supply feeding the internal combustion engine with power, when the ignition starter switch is in the normal operating position.

14. The hybrid drive device of claim 11, wherein the limited torque is less than a maximum torque and/or a continuous torque of the electric machine.

15. The hybrid drive device of claim 11, wherein the limited time span is selected such that the temperature of the electric machine remains below the maximum temperature even when the electric machine is operated at maximum torque.

16. The hybrid drive device of claim 11, further comprising an on-board electrical system, said electric machine being operated in the emergency operating mode as a generator for supporting the on-board electrical system.

17. The hybrid drive device of claim 11, further comprising a control unit operably connected to the temperature sensor and configured to initiate the emergency operating mode, when detecting the defect of the temperature sensor.

* * * * *